US011622552B2

(12) United States Patent
Peltekian

(10) Patent No.: US 11,622,552 B2
(45) Date of Patent: Apr. 11, 2023

(54) FLYING INSECT DETERRENCE SYSTEM AND DEVICE

(71) Applicant: No Fly Zone, LLC, Midvale, UT (US)

(72) Inventor: Ryan Peltekian, Midvale, UT (US)

(73) Assignee: NO FLY ZONE, LLC, Midvale, UT (US)

( * ) Notice: Subject to any disclaimer, the term of this patent is extended or adjusted under 35 U.S.C. 154(b) by 214 days.

(21) Appl. No.: 16/583,614

(22) Filed: Sep. 26, 2019

(65) Prior Publication Data
US 2020/0093119 A1 Mar. 26, 2020

Related U.S. Application Data

(60) Provisional application No. 62/736,603, filed on Sep. 26, 2018.

(51) Int. Cl.
*A01M 29/06* (2011.01)
*A01M 29/34* (2011.01)

(52) U.S. Cl.
CPC ............ *A01M 29/06* (2013.01); *A01M 29/34* (2013.01)

(58) Field of Classification Search
CPC .. A01M 29/00; A01M 5/00; A01M 2200/012; A01M 1/00; A01M 29/24; A01M 29/06
See application file for complete search history.

(56) References Cited

U.S. PATENT DOCUMENTS 5,003,721 A 4/1991 Underwood
5,343,651 A * 9/1994 Chatten ................. A01M 29/32
43/1
6,282,833 B1 9/2001 Dashefsky
9,565,845 B1 * 2/2017 Beesley .................. A01M 1/00
2013/0067798 A1 * 3/2013 Keltner ................ A01M 29/34
43/137

FOREIGN PATENT DOCUMENTS

AU 2011100135 B4 2/2011
AU 2011100135 A4 * 3/2011 ............ A01M 29/06
WO 2017156572 A1 9/2017
WO WO-2017156572 A1 * 9/2017 ............ A01M 29/08

OTHER PUBLICATIONS

University of Florida, "Color is key in controlling flies, UF researchers find", Feb. 15, 2012, https://news.ufl.edu/archive/2012/02/color-is-key-in-controlling-flies-uf-researchers-find.html (Year: 2012).*

* cited by examiner

*Primary Examiner* — Joshua J Michener
*Assistant Examiner* — Nicole Paige MacCrate
(74) *Attorney, Agent, or Firm* — Travis Banta; Loyal IP Law, PLLC

(57) ABSTRACT

A flying insect deterrence system and device is provided. The flying insect deterrence device may include a rotary element, a vertical column, a cordage, a cordage element, and a motor. The flying insect deterrence system may include a base and an insect deterrence device. The insect deterrence device may include a vertical column, a rotary element, a motor, a cordage, and a cordage element. The rotary device is located on top of the vertical column and is powered by the motor that spins a cordage attached to the rotary device to deter flying insects from flying or landing in the area.

18 Claims, 3 Drawing Sheets

FLYING INSECT DETERRENCE SYSTEM AND DEVICE

BACKGROUND

1. Priority Claims

This application claims the benefit of U.S. Provisional Application No. 62/736,603, filed Sep. 26, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

2. Technical Field

This disclosure relates generally to a flying insect deterrence system and device. The flying insect system provides a freestanding device with a rotating element to deter flying insects.

3. Description of the Related Art

Flying insects have pestered humans since humans began occupying Earth. In many cultures, insects were considered a curse that was a punishment for misdeeds. In fact, one of the curses on Egypt in antiquity were plagues of flying insects. Flying insects are attracted to fruit, meat, trash and sugary substances which are all ubiquitously found among humans. At the same time, however, flying insects are notorious carriers of diseases that include but are not limited to typhoid fever, dysentery, cholera, malaria, leprosy, and tuberculosis. In addition to carrying diseases, many people and animals find flying insects to be extremely annoying and disruptive.

Methods of dealing with flying insects are more diverse than the diseases they carry. Perhaps the most common modern way of dealing with flying insects is with a fly swatter. A fly swatter consists of a flexible paddle portion that is mounted on the end of a wire or pole. In practice, the velocity of the flexible paddle portion on the end of the wire or pole is accelerated to the point where human reflexes are fast enough to swat an insect with the flexible paddle portion. Unfortunately, the insect is crushed which results in the remains of the insect being embedded in the paddle portion of the fly swatter, which many people find distasteful.

Another conventional solution for keeping insects at bay includes candles that burn citronella oil These candles, however, require a flame and have a pungent odor that keeps flying insects away by masking smells of food or other insect attractants with smoke. Citronella candles are typically single use items, use an open flame as a combustion source, and have limited effectiveness over a large area. Citronella smoke and odor can also be overwhelming to people in the densities necessary to provide real deterrence to flying insects.

Another popular way of deterring flying insects from interaction with people is commonly known as bug spray. However, bug spray also has a pungent odor and requires physical application of chemicals to a person's body. Moreover, it requires frequent reapplication as it wears off. Many individuals refuse to use bug spray because of the constant application of chemicals to their body and fear unintended consequences of those chemicals.

In other situations, some plants have also been used to deter flying insects but require significant maintenance that includes watering, weeding, fertilizing and keeping them in a suitable environment with the appropriate sunlight and temperature. Moreover, plants tend to be less mobile and hard to transport providing limited small areas to enjoy an insect free environment as many of these plants are planted in the ground or in large pots that are unwieldly to transport. Such a solution is simply untenable in, for example, camping applications.

Another conventional solution to flying insects includes a device commonly known as a salt gun. The salt gun is a gun like mechanism that uses a spring loaded piston to push air that fires salt as a projectile from a barrel of the gun like mechanism. The salt impacts the flying insect and destroys the insect's wings or body. However, the salt gun has certain drawbacks such as leaving salt residue where it is fired, a limited spread pattern for impacting insects, and usually requires another tool to finally dispatch a wounded insect. The salt gun also requires the focus of a person to fire and physical manipulation of the salt gun which may be disruptive to the person's intended activities.

It is therefore one object of this disclosure to provide a flying insect deterrence device which deters flying insects from interacting with people in a manner that relieves the people of manually interacting with devices that kill the insects. It is a further object of this disclosure to provide a system which provides a device with various cordage elements that cause air currents which deter flying insects from interacting with people or food or any object around device in the system.

SUMMARY

Disclosed herein is a flying insect deterrence device. The device may include a vertical column and a rotary element connected to a cordage and a motor. A cordage element may be disposed on the cordage.

Also, disclosed herein is a flying insect deterrence system which may include a base and an insect deterrence device. The insect deterrence device may include a vertical column that is inserted into the base, rotary element that connects to a vertical column, a motor, and a cordage. Additionally, the cordage element may be disposed on the cordage. As the rotary element spin, the cordage attached to the rotary device spins as well. The spinning of the cordage provides deterrence from insects that want to fly or land in the area.

BRIEF DESCRIPTION OF DRAWINGS

The accompanying drawings illustrate several embodiments of flying insect deterrence system and device. The illustrated embodiments are exemplary and do not limit the scope of the disclosure.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the system and device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein.

Figure 1:
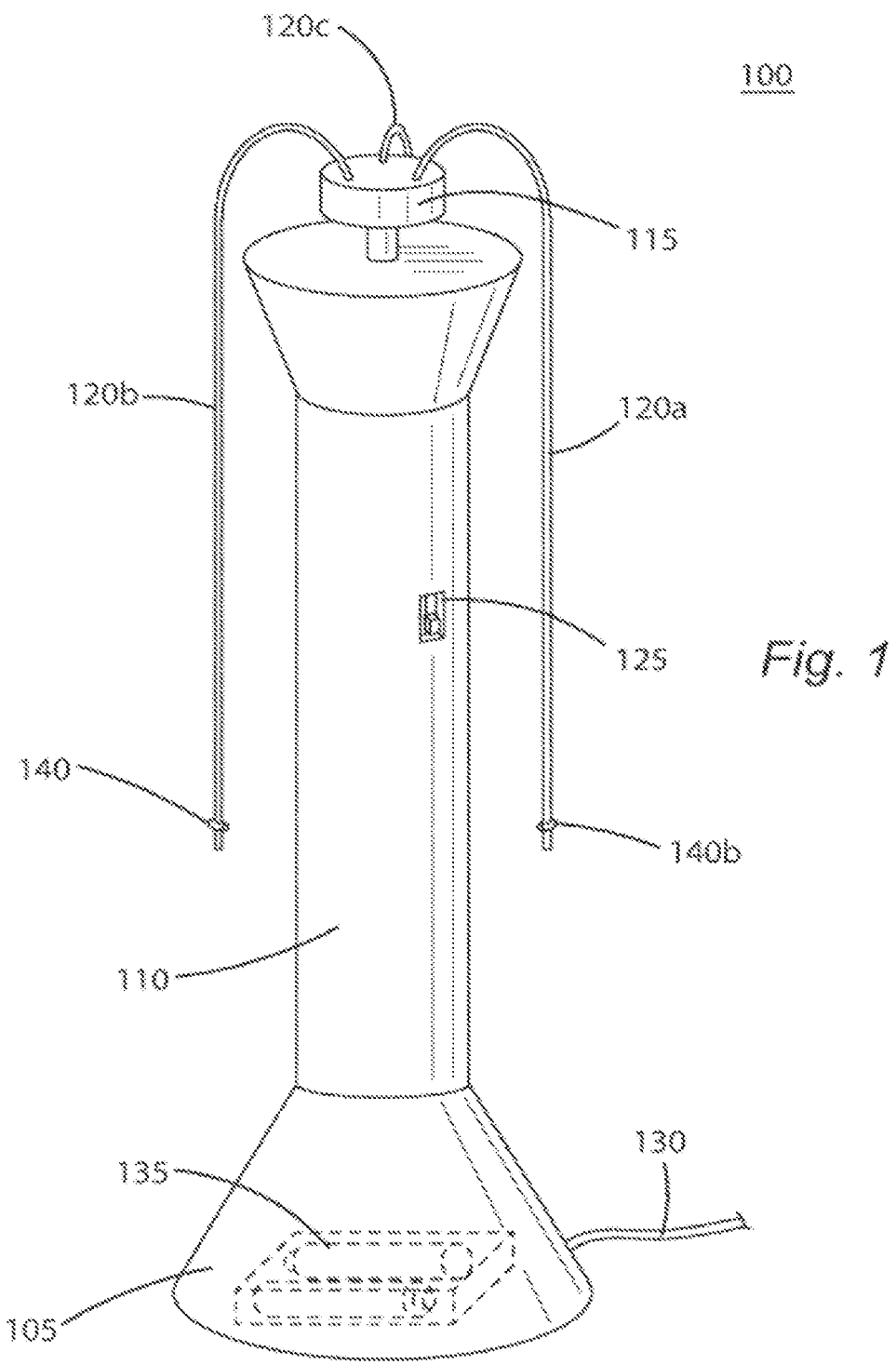
FIG. 1 illustrates a side view of an embodiment of a flying insect deterrence system and device.

FIG. 1 illustrates a front view of an embodiment of a flying insect deterrence device 100. Flying insect deterrence device 100 may include base 105 that attaches to vertical column 110. Base 105 keeps vertical column 110 upright and base 105 may be a cone shape as shown or cuboidal, round, or any other shape that serves to support vertical column 110 in an upright position. Furthermore, base 105 may be detachable from vertical column 110. Attached to vertical column 110 is rotary element 115 that is connected to a switched motor 125. Switched motor 125 may be connected directly to rotary element 115 or may be indirectly connected to rotary element 115 by one or more gears which drive rotary element 115 and which may control a speed of rotation of rotary element 115 such that rotary element 115 may have adjustable speeds up to 120 rotations per minute.

Attached to rotary element 115 may be a single cordage 120 or a plurality of cordages (i.e. 120a 120b 120c). Cordage 120 may include, for example, woven strands of string, rope, plastics including hard and soft plastics, polymers, co-polymers, metal, wood, stone, or any other material that maybe fashioned in an extended cylindrical tube, which may be a solid cylinder or a hollow cylinder. Cordages 120a, 120b, and 120c may be implemented in rotary element 115 by connecting cordages 120a, 120b, and 120c directly to rotary element 115. Cordages 120a, 120b and 120c may be disposed at equal angles from one another around a circumference of rotary element 115. Cordages 120a, 120b, and 120c may be flexible or rigid depending on a choice of material. Cordages 120a, 120b, and 120c are considered rigid when the rotary element 115 is not spinning and the cordages 120a, 120b, and 120c remain stiff and substantially perpendicular to vertical column 110. Substantially perpendicular in this context means within 10 degrees of perpendicular to vertical column 110. On the other hand, and as shown in FIG. 1, cordages 120a, 120b, and 120c are considered flexible when rotary element 115 is not spinning and the cordages 120a, 120b, and 120c are less than substantially perpendicular to vertical column 110. Furthermore, cordages 120a, 120b, and 120c may vary in length, thickness and color. However, studies have shown that flies are more deterred by the color yellow and, in one preferred embodiment, cordages 120a 120b, and 120c may be yellow. In another embodiment, the entire flying insect deterrence device 100 may be yellow. Cordage 120a, 120b, and 120c may include cordage elements 140 140b (a cordage element 140c which is provided on cordage 120c is not shown with respect to cordage 120c due to perspective). Cordage element 140 and 140b may be a knot attached the end of cordage 120a, 120b, or 120c. Alternatively, cordage elements 140 and 140b may also be implemented as beads or weights disposed at or near (e.g., within an inch of the end of cordage 120a, 120b, or 120c) an end of cordage 120a, 120b, or 120c that is not attached to rotary element 115. Furthermore, cordage element 140a may be attached at a substantially middle portion of cordage 120a, 120b, or 120c. Moreover, cordage 120a, 120b, or 120c may include a plurality of cordage elements 140 or 140b. The cordage element 140 or 140b may be implemented as a tassel or a bead or an additional cord of various shapes sizes and color. Similarly, cordages 120b and 120c may include cordage elements 140b and 140c attached to the end of cordage 120b and or 120c. Flying insect deterrence device 100 may include on/off switched motor 125.

To create the rotation in rotary element 115, rotary element 115 is attached to switched motor 125. Switched motor 125 is receives power from power source 130 and or power source 135. Power source 130 may be a cord that connects to AC power to power switched motor 125 or the cord may be connected to a DC power source to recharge power source 135 or may be connected directly to switched motor 125. It should be noted that power configurations may vary significantly from those shown but are within the scope and disclosure of the teachings herein. It should also be noted that the specific power configurations herein are merely representative illustrations of various types of power sources that could be implemented. In other words, switched motor 125 may be an AC motor or a DC motor and may rely on power from a conventional 120v or 240v outlet in an AC, rectified AC to DC or DC configuration which may supply power directly to switched motor 125 or may supply power to batteries. Regardless, each of these teachings are conceptualized herein and referred to as a power source.

Figure 2:
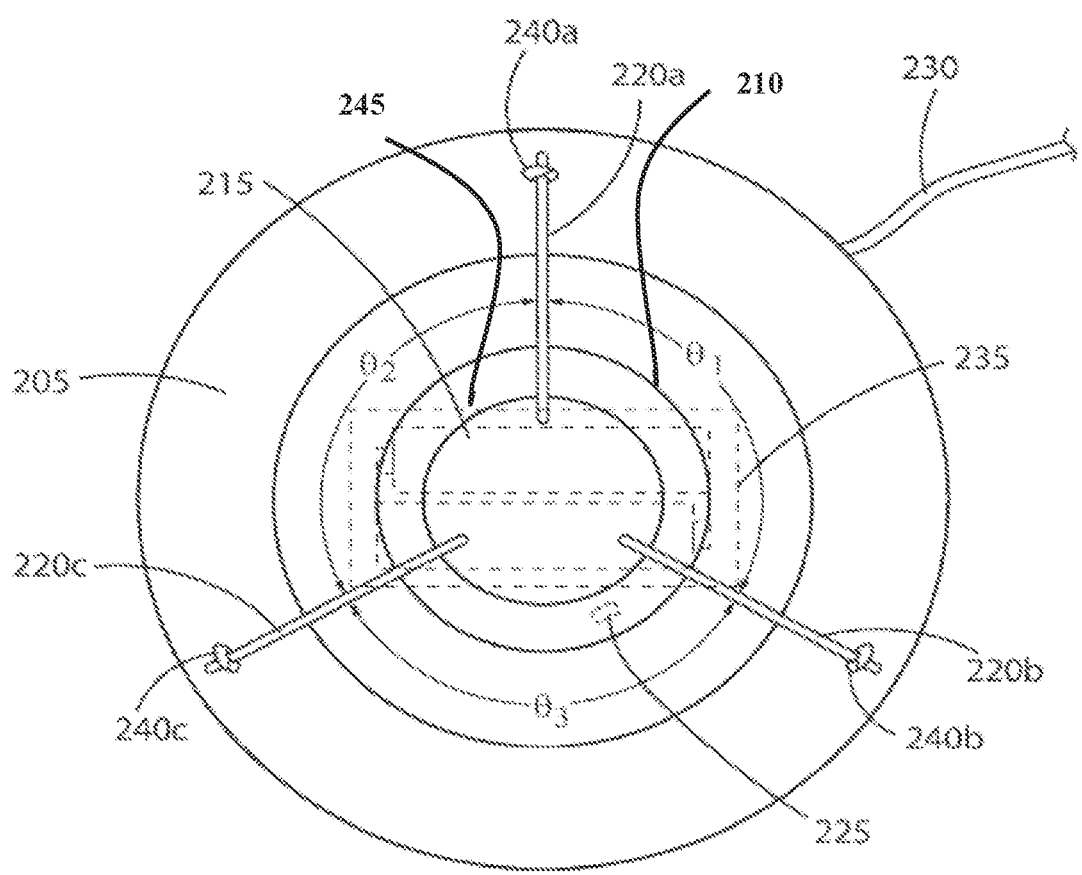
FIG. 2 illustrates a top view of an embodiment of a flying insect deterrence system and device.

FIG. 2 illustrates a top view of an embodiment of a flying insect deterrence device 200. Flying insect deterrence device 200 may include base 205 that attaches to vertical column 210. Base 205 keeps vertical column 210 upright and base 205 may be a cone shape as shown or cuboidal, disc or any shape, used as a base by a person having ordinary skill in the art may propose. Furthermore, base 205 may be detachable from vertical column 210. Attached to vertical column 210 is rotary element 215 that is connected to motor (not shown due to perspective). Rotary element 215 may have adjustable speeds up to 120 rpm.

Attached to rotary element 215 may be only cordage 220a or a plurality of cordages for example cordages 220a, 220b, and 220c. Cordages 220a, 220b, and 220c may but set at equal angles from one another (e.g., $\theta_1$, $\theta_2$, $\theta_3$, etc.) about a circumference of rotary element 215. Cordages 220a, 220b, and 220c may be flexible or rigid or a combination of both flexible and rigid. Cordages 220a, 220b, and 220c are considered rigid when the rotary element 215 is not spinning and the cordages 220a, 220b, and 220c remain substantially perpendicular to vertical column 210. Substantially perpendicular in this context means within 10 degrees of perpendicular to vertical column 210. On the other hand, and as shown in FIG. 2, Cordages 220a, 220b, and 220c are considered flexible when rotary element 215 is not spinning and cordages 220a, 220b, and 220c are less than substantially perpendicular to vertical column 210. Cordages 220a, 220b, and 220c may vary in length, thickness and color. Studies have shown that flies, in particular, have an aversion to the color yellow. Accordingly, in a preferable embodiment, cordages 220a 220b and 220c may be yellow. For the same reasons, flying insect deterrence device 200 may be yellow. Cordage 220a may include a cordage element 240a. For example, cordage element 240a may be a knot attached to an end of cordage 220a (or near an end of cordage 220a). Furthermore, cordage element 240a may be attached at a substantially middle portion of cordage 220. Moreover, cordage 220a may include a plurality of cordage elements 240a. Cordage elements 240a may be a tassel or a bead or an additional cord of various shapes sizes and color. Cordage elements 240 may be any variety of cordage, plastic, or any other element known to a person with ordinary skill in the art. Similarly, cordages 220b and 220c may include cordage elements 240b and 240c attached to the end of cordage 220b and or 220c. Flying insect deterrence device 200 may include on/off switched motor 225.

To create the rotation in rotary element 215, element 215 is attached to a switched motor 225. Switched motor 225 is powered by power source 230 and or power source 235. Power source 230 may be a cord that connects to an AC power to power motor 245 or the cord may be connected to a DC power source to recharge power source 235 or provide DC electricity directly to the motor. It should be noted that power configurations may vary significantly from those shown but are within the scope and disclosure of the teachings herein. It should also be noted that the specific power configurations herein are merely representative illustrations of various types of power sources that could be implemented. In other words, the motor may be an AC motor or a DC motor and may rely on power from a conventional 120v or 240v outlet in an AC or rectified DC configuration which may supply power directly to the motor or may supply power to batteries. Regardless, each of these teachings are conceptualized herein and referred to as power source 230.

Figure 3:
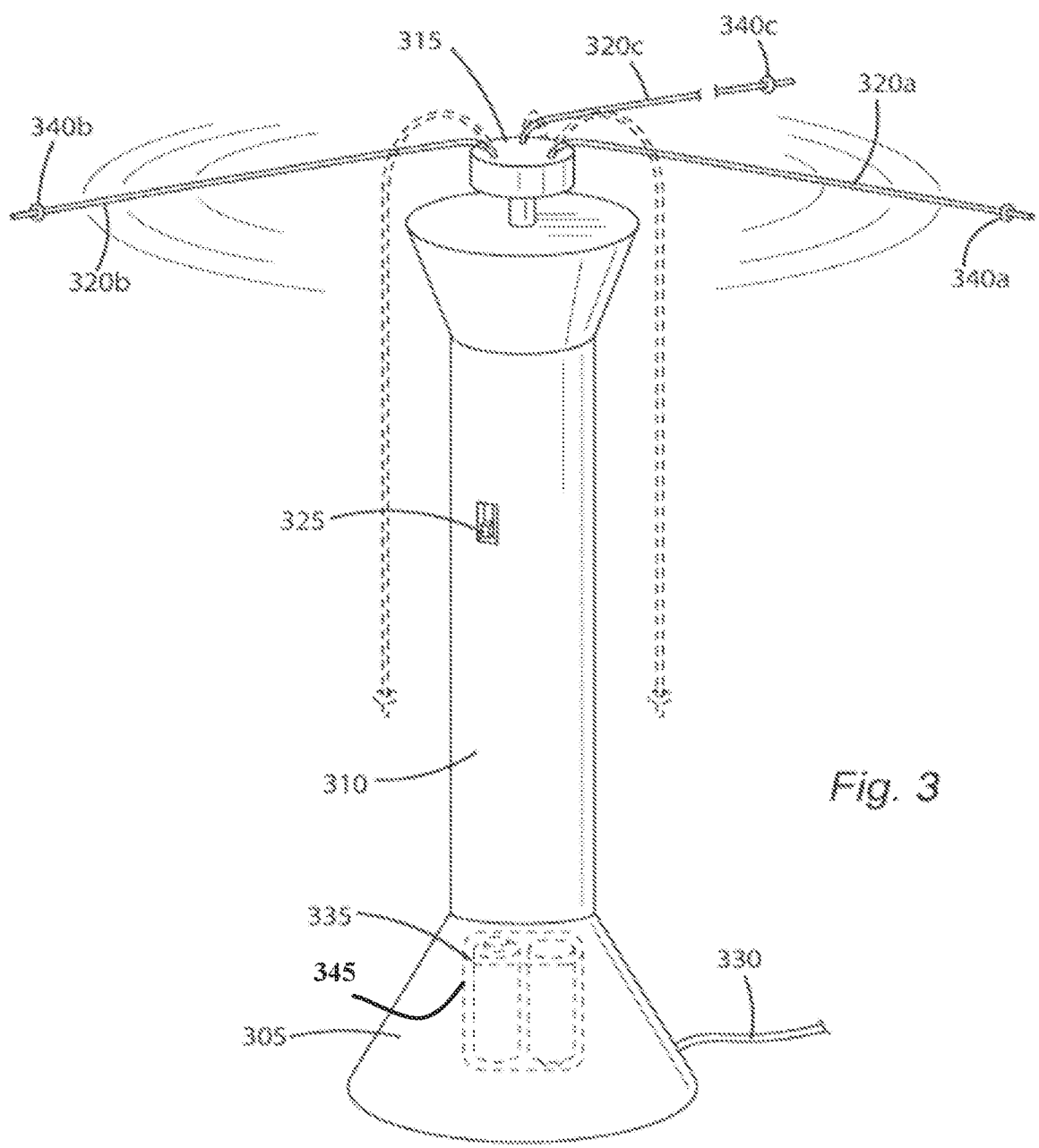
FIG. 3 illustrates a side view of an embodiment of a flying insect deterrence system and device activated.

FIG. 3 illustrates a side view of an embodiment of a flying insect deterrence system and device operating in an activated condition. Flying insect deterrence device 300 may include a base 305 that attaches to vertical column 310. Base 305 keeps vertical column 310 upright and base 305 may be a cone shape as shown or cuboidal, round, disc or any other shape, used as a base. Furthermore, base 305 may be detachable from vertical column 310. Attached to vertical column 310 is rotary element 315 that is connected to switched motor 325. Rotary element 315 may have adjustable speeds up to 120 rpm.

Attached to rotary element 315 may be a single cordage 320a or a plurality of cordages, for example, but not limited to cordages 320a, 320b, and 320c. Cordages 320a, 320b, and 320c may be set at equal angles from one another, as shown and described with respect to FIG. 2, above. Cordages 320a, 320b, and 320c may be flexible or rigid or a combination of both flexible and rigid. Cordages 320a, 320b, and 320c are considered rigid when the rotary element 315 is not spinning and the cordages 320a, 320b, and 320c remain substantially perpendicular to vertical column 310. Substantially perpendicular in this context is to mean within 10 degrees of perpendicular to vertical column 310. On the other hand, cordages 320a, 320b, and 320c are considered flexible when rotary element 315 is not spinning the cordages 320a, 320b, and 320c are less than substantially perpendicular to vertical column 310. Cordages 320a, 320b, and 320c may vary in length, thickness and color. Both cordages 320a, 320b, 320c, and vertical column 310 may be yellow, as previously discussed. Cordage 320a may include a cordage element 340a. For example, cordage element 340a may be a knot or a bead attached at an end (or substantially near the end) of cordage 320a, 320b, and 320c (where substantially near the end means anywhere that is between half the length of cordage 320a, 320b, and 320c and the end of cordage 320a, 320b, and 320c). Furthermore, cordage element 340a may be attached at a substantially middle portion of cordage 320. Moreover, cordage 320a may include a plurality of cordage elements 340a. Cordage element 340a may be a tassel or a bead or an additional cord of various shapes sizes and color. Cordage element may be any variety of items known to a person with ordinary skill in the art. Similarly, cordages 320b and 320c may include cordage elements 340b and 340c attached to the end of cordage 320b and or 320c. Flying insect deterrence system and device 300 may include on/off switched motor 325.

To create the rotation in rotary element 315, rotary element 315 is attached to switched motor 325. Switched motor 325 is powered by power source 330 and or power source 335. Power source 330 may be a cord that connects to an AC power to power motor 345 or the cord may be connected to a DC power source to recharge power source 335. It should be noted that power configurations may vary significantly from those shown but are within the scope and disclosure of the teachings herein. It should also be noted that the specific power configurations herein are merely representative illustrations of various types of power sources that could be implemented. In other words, switched motor 325 may be an AC motor or a DC motor and may rely on power from a conventional 120v or 240v outlet in an AC, rectified AC/DC or DC configuration which may supply power directly to switched motor 325 or may supply power to batteries. Regardless, each of these teachings are conceptualized herein and referred to as a power source.

In FIG. 3, the switched motor 325 has been actuated such that the switched motor 325 receives power from power source 330 or 335. Switched motor 325 begins to spin rotating element 315 which lifts flexible cordages 320a, 320b, and 320c from a stationary position by centrifugal force to swing around flying insect deterrence device 300 in an operating position, although it should be noted that cordages 320a, 320b, and 320c may also be rigid and not subject to substantial lift at actuation of switched motor 325. As shown in FIG. 3, cordages 320a, 320b, and 320c may be positioned at approximately 90 degrees to vertical column 310 when flying insect deterrence device 300 is in operation. However, the angle of cordages 320a, 320b, and 320c relative to vertical column 310 may be adjusted by both a speed, in terms of rotations per minute of switched motor 325 or by an amount of weight implemented as cordage elements 340a, 340b, and 340c. Thus, cordages 320a, 320b, and 320c may be positioned at any angle between 0 degrees and 90 degrees depending on the speed of switched motor 325 and a weight implemented as cordage elements 340a, 340b, and 340c. In this manner, the angle of cordages 320a, 320b, and 320c may be variable between 0 degrees and 90 degrees. Finally, it is noted that multiple flying insect deterrence device 300, or flying insect deterrence device 100 shown in FIG. 1, or flying insect deterrence device 200 shown in FIG. 2 may be implemented as a system by combining a plurality of flying insect deterrence devices 100, 200, or 300 in a particular area. For example, a plurality of flying insect deterrence devices set on a picnic table may implement a system of flying insect deterrence.

What is claimed is:
1. A device comprising:
a rotary element;
a vertical column that is connected to the rotary element on a first end, the vertical column being cylindrical with a constant diameter and including a motor switch on an exterior surface of the vertical column;
a motor within the vertical column that is connected to the rotary element and causes the rotary element to spin when the motor is running;
a plurality of cordages that are connected to the rotary element, wherein each single one of the plurality of cordages extends outward from the rotary element at the connection between the each single one of the plurality of cordages and the rotary element and, wherein each single one of the plurality of cordages is disposed within 10 degrees of perpendicular to the vertical column when the motor is running;

a cordage element disposed on at least one of the plurality of cordages; and a base that is connectable to the vertical column on a second end of the vertical column, the base having a conical shape, a first end of the base, and a second end of the base, wherein the vertical column has a length which is longer than a length of the base, wherein the first end of the base is narrower than the second end and connectable to the vertical column, wherein the second end of the base is wider than the first end of the base and disposed opposite to the first end of the base on the base, and wherein the base includes a power source located within the base and between the first end of the base and the second end of the base.

2. The device of claim 1, wherein the cordage element is a bead.

3. The device of claim 1, wherein the rotary element rotates about an axis line defined as extending vertically through a center of the vertical column.

4. The device of claim 2, wherein the cordage element is located substantially near an end of the cordage.

5. The device of claim 2, wherein the cordage element is made using a first color.

6. The device of claim 1, wherein each one of the cordages in the plurality of cordages is connected on one end of each one of the plurality of cordages to the rotary element.

7. The device of claim 1, wherein the cordage is rigid.

8. The device of claim 1, wherein the cordage is flexible.

9. The device of claim 6, wherein one or more of the plurality of cordages is flexible.

10. The device of claim 6, wherein one or more of the cordages is rigid.

11. The device of claim 1, wherein the motor is powered by direct current electricity.

12. The device of claim 1, wherein the motor is powered by alternating current electricity.

13. The device of claim 1, wherein at least one of the plurality of cordages is made using a second color.

14. The device of claim 1, wherein the motor receives either alternating current or direct current electricity.

15. The device of claim 1, wherein rotation of a motor shaft in the motor causes rotation of the rotary element.

16. A system comprising:

a base having a conical shape, a first end of the base having a vertical column attachment, and a second end of the base, wherein the first end of the base is narrower than the second end of the base and is configured to receive the vertical column attachment, wherein the second end is wider than the first end and disposed opposite to the first end on the base, and wherein the base includes a power source located within the base and between the first end of the base and the second end of the base; and an insect deterrence device, comprising:

a vertical column that attaches to the vertical column attachment of the first end of the base at a first end of the vertical column, the vertical column being cylindrical with a constant diameter, including a motor switch on an exterior surface of the vertical column, and having a length which is longer than a length of the base;

a rotary element that connects to the vertical column on a second end of the vertical column and rotates around an axis line extending vertically through a center of the vertical column;

a motor within the vertical column that is connected to the rotary element and causes the rotary element to spin when the motor is running;

a plurality of cordages that are connected to the rotary element wherein each single one of the plurality of cordages extends outward from the rotary element at the connection between the one of the plurality of cordages and the rotary element and, wherein each single one of the plurality of cordages is disposed within 10 degrees of perpendicular to the vertical column when the motor is running; and a cordage element disposed on at least one of the plurality of cordages.

17. The system of claim 16, wherein each cordage in the plurality of cordages includes a cordage element.

18. The system of claim 16, wherein the plurality of cordages are made using a first color and the cordage element is made using a second color.

* * * * *